Oct. 6, 1959     A. MEIXNER     2,907,255
GUIDE MEANS FOR PHOTOGRAPHIC CAMERAS
Filed Sept. 3, 1957     3 Sheets-Sheet 1

*INVENTOR*
ALFRED MEIXNER
BY
*Mocker Blum*
ATTORNEYS

Oct. 6, 1959 A. MEIXNER 2,907,255
GUIDE MEANS FOR PHOTOGRAPHIC CAMERAS
Filed Sept. 3, 1957 3 Sheets-Sheet 3

INVENTOR
ALFRED MEIXNER
BY
Mock & Blum
ATTORNEYS

United States Patent Office 2,907,255
Patented Oct. 6, 1959

2,907,255
GUIDE MEANS FOR PHOTOGRAPHIC CAMERAS

Alfred Meixner, Braunschweig, Germany, assignor to Voigtlander A.G., Braunschweig, Germany, a corporation of Germany Application September 3, 1957, Serial No. 681,626

Claims priority, application Germany September 5, 1956

5 Claims. (Cl. 95—44)

This invention relates to guide means for photographic cameras and it has particular relation to a device for guiding the objective carrier during its displacement or movement.

It is well known that the withdrawing or pull-out movement of the objective carrier, necessary for sharp focusing, must meet high requirements, because it is of decisive importance that no tilting of the objective in the adjusted positions occurs. The optical axis must be always preserved. Numerous suggestions have been made in order to meet these requirements, but in carrying out these suggestions high precision is required and the manufacturing costs are high.

According to the present invention the use of ball column guides is contemplated, whereby several advantages are obtained. One advantage is that under certain conditions it is sufficient to use a two-armed embodiment, whereby, nevertheless, an exact alignment and an easy and precise guiding are assured. Furthermore, their manufacture and mounting is simple and inexpensive. Even at relatively high tolerances, their accuracy is reliably obtained.

The present invention can be carried out in various modifications. For example the guide columns can be unilaterally, or on both sides, fastened to the camera casing and they can engage bores provided in the objective carrier member. Or, vice versa, the guide columns can be fastened to the objective carrier member on one side, or on both sides, and engage stationary bores provided in the camera body.

According to a preferred embodiment of the invention, the guide means are provided on the objective carrier member proper, while the guide columns inserted therein, are fastened on the camera casing. Thereby, projecting eyes for the guide can be provided on the objective carrier member, which require relatively little space. These eyes can be provided with a guide bushing. Between the guide wall of said bushing and the guide column, a cylindrical jacket or mantle is arranged, which carries balls distributed over its periphery. This ball carrier is of such length that it can assure guiding along the entire displacement path. It is, therefore, preferably longer than the guide bushing. Said bushing proper does not participate in the entire withdrawal movement and is displaced by a shorter distance only.

It has been known to use ball guides for guiding the draw tube of a camera in their frame. In such devices using guide balls or rollers often difficulties occur, because the two members to be mutually guided may be jammed or obtain an undesired play, due to different thermal expansion or shrinking, for example of the outer member, relative to the inner member. The same disadvantages occur in the known use of simple pin guides, in which pins fastened on the objective carrier are longitudinally displaceably directly guided in bushings of the camera body.

These difficulties are eliminated by the arrangement of the ball guide in the objective carrier body, according to the present invention, because the guide means arranged in this manner absorb the increased pressure of the two parts against each other, which results from differences of temperature, on a relatively narrowly limited surface, i.e. on the half periphery of the ball cage. This does not result in a substantial reduction of mobility, because the balls satisfactorily roll on even under increased pressure, and it offers the advantage that in the case of shrinking, as well as expansion of one part relative to the other, the precision of guiding is even increased. In addition to this, the guiding arrangement according to the present invention shows—independently from external influences due to the dimensions of the columns—an essentially more favorable guiding ratio in comparison with the known ball guide devices in camera frames. The two frame or tubulous members to be displaced relative to each other, can be arranged at any desired distance from each other, without affecting the precision of the displacing movement.

The appended drawings illustrate by way of example a specific embodiment and best mode for carrying out the invention, to which the invention is not limited.

In the drawings.

Identical parts are denoted by identical reference symbols in the figures.

Figure 1:
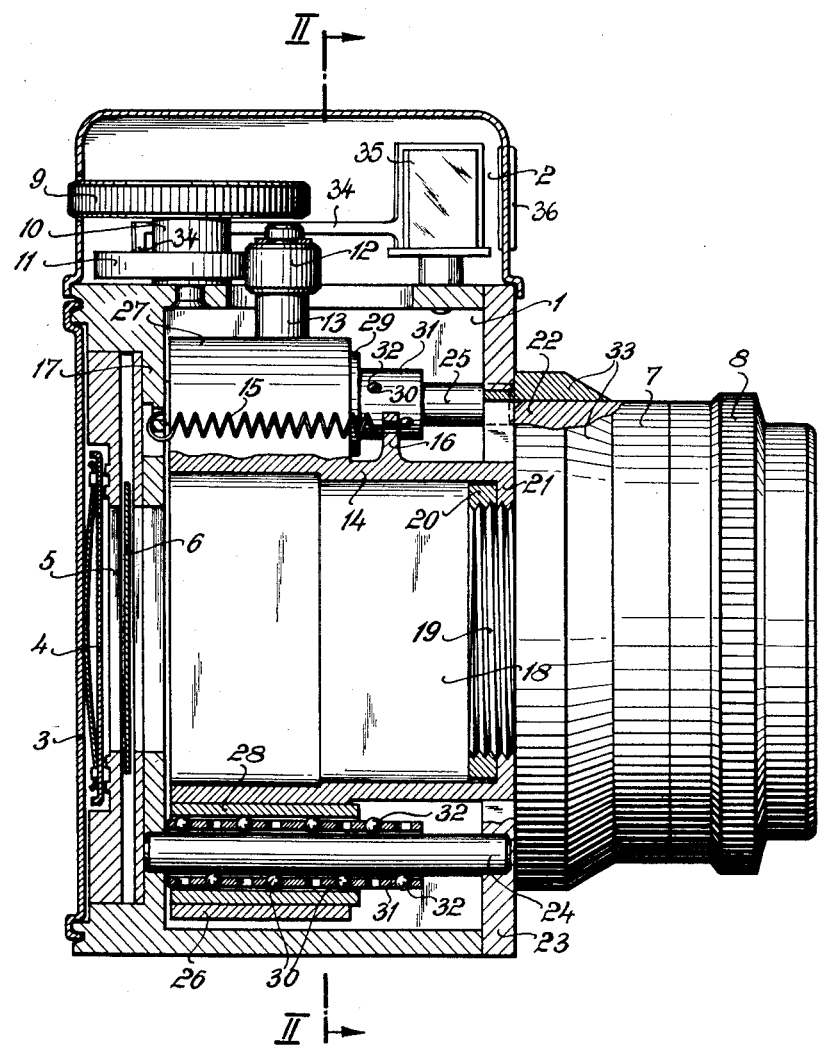
Figure 1 illustrates in lateral view a photographic tube camera with a double ball column guide, partially in section taken along line I—I in Fig. 2.
Figure 2:
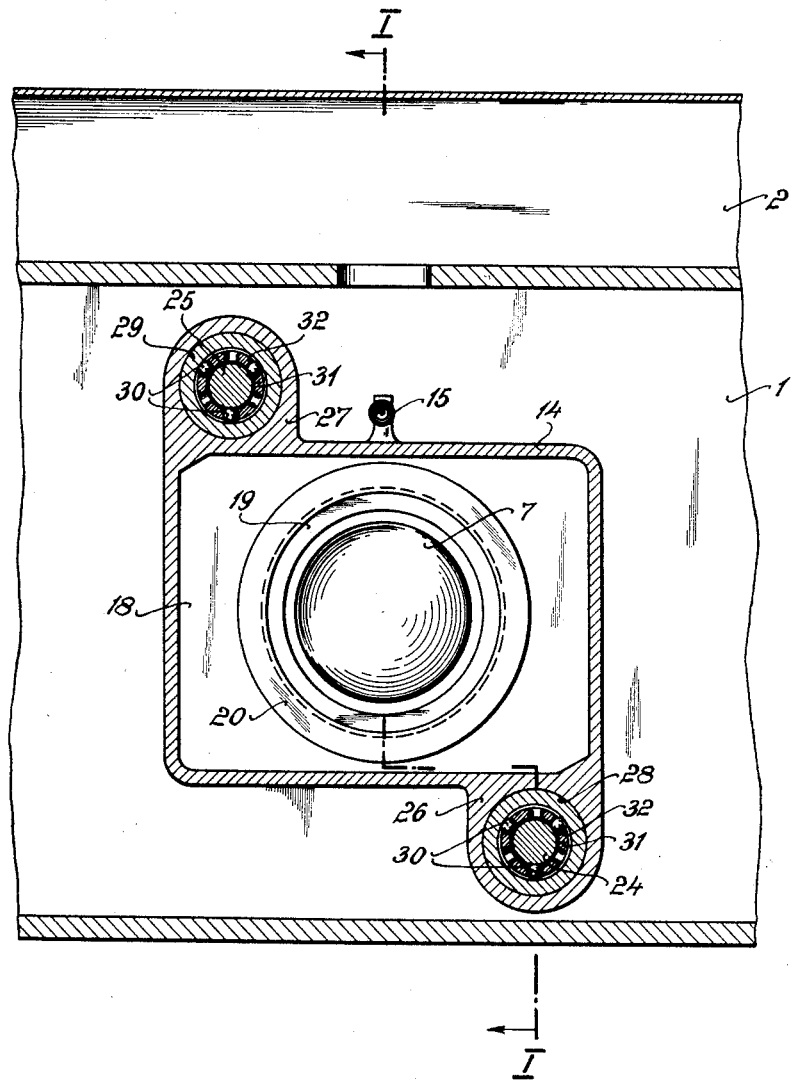
Figure 2 illustrates the same camera viewed from the rear, the casing being partially broken away, partially in section taken along line II—II in Fig. 1.

Referring now to the drawings in detail, in Fig. 1 reference numeral 1 denotes a photographic tube camera. The upper cap of the camera is shown at 2, the rear wall of the camera at 3, the film pressure plate at 4 and the image aperture at 5. A focal plane shutter is indicated at 6. Reference symbol 7 denotes the objective arranged for total displacement and provided with diaphragm adjusting ring 8. In said cap 2 the adjusting handle member 9 for advancing the objective, can be seen. Said member 9 carries on its shaft 10 a fixedly arranged cam 11. A pin 13 provided with a contact roller 12, and a scanning lever 34, which brings about adjustment of the measuring finder in conventional manner, lie against said cam 11. Reference symbol 35 denotes the tiltable mirror of the range finder, said mirror being caused to move by scanning lever 34 and the measuring rays entering through window 36 provided in camera cap 2. Said pin 13 is fixedly connected with objective carrier body 14 and held in permanent engagement with cam 11, by a spring 15. This spring is stretched between a lug 16 provided on the objective-carrying body 14 and a wall 17 of camera body 1. The interior space 18 of said body 14 forms the tube for the path of rays passing through the objective. Objective 7 has a connecting piece 19 and is firmly screwed by said piece against collar 21 of objective-carrying body 14 by means of threaded ring 20. For the use of exchangeable objectives, any suitable conventional locking means can be used instead of the screw connection shown in Fig. 1.

By the effect of spring 15, the objective-carrying body 14 and objective 7 fixedly connected to said body, are drawn in the direction toward the image aperture until the objective mount 22 abuts at the front wall 23 of camera body 1. This position—which is shown in Fig. 1—corresponds to the adjustment of the objective to infinite. If the objective is supposed to be adjusted to a nearer distance, it must be advanced and it is important in this movement to preserve the optical axis as exactly as possible. In order to attain this, the arrangement of the invention is used in the camera. Extending between walls 17 and 23 of the camera body are column guides 24 and 25, which are fixedly secured in said walls and preferably consist of hardened steel pins. They are arranged diametrically relative to each other. The objective-carrying body is provided, in a corresponding arrangement, with laterally projecting eyes 26 and 27 and the bores of the latter enclose members 24 and 25. Inserted in said bores and fixedly connected to them, are steel bushings 28 and 29. Between the inner walls of these bushings and the surface of the guide columns, steel balls 30 are arranged, which are held in a so-called ball cage formed by a cylindrical jacket 31. Thereby the balls 30 are seated in bores 32 of mantle or jacket 31, said bores being conically narrowed in outward direction, in order to prevent dropping out of the balls. The length of jacket or ball cage 31 is selected in such a manner that the guide bushings 28, 29, find, in each advanced position of the objective-carrying body 14, over their total length, a support on guide columns 24, 25. Thus, ball cage 31 fills the entire length of bushings 28, 29 and projects from the bushing beyond said length by half of the total displacement path, or somewhat less. If the objective-carrying body 14 is shifted to the objective position corresponding to the next distance of the object, bushing 28 or 29 moves until abutting at the camera front wall 23 and ball cage 31, which moves only by half of this displacement path, projects with its other end, i.e. in the direction to the rear, from the bushing. However, the bushing proper is even then filled over its entire length by the ball cage so that in each and every advanced position the same precision for the position of the optical axis is assured. In order to cover the gap formed upon advancing the objective, between the objective mount 22 and camera front wall 23, the latter carries a ring 33, which overlaps the objective mount 22 to a corresponding extent.

It is contemplated according to the present invention to arrange the column guide means in a reversed manner, whereby the guide columns are coordinated with the objective-carrying body and the guide bushings are coordinated with the camera body.

Figure 3:
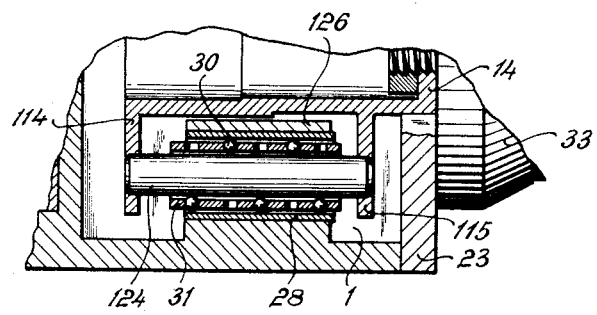
Figure 3 illustrates a ball column guide construction in which the guide columns are fastened to the objective carrier.

Such an embodiment is illustrated in Fig. 3, in which only the lower part of the camera casing (which is fully shown in Fig. 1) is illustrated. The guide column denoted by reference symbol 124 is here fastened to two flaps 114 and 115, projecting from objective carrier 14 and is guided in the manner already described above in an eye 126 of the camera body.

According to a further variation of the invention, the guide columns are fastened at one of their ends only. In this modification, one end of the columns is inserted in a lug provided on the camera body, while the other, free end enters the guide bushing on the objective-carrying body. In this case too, the arrangement can be reversed.

Figure 4:
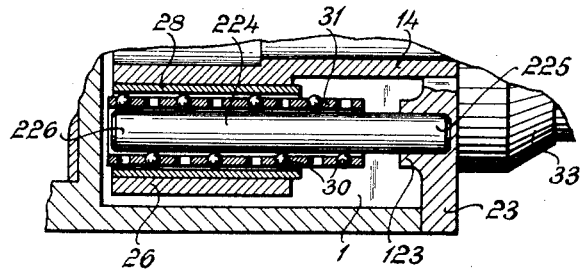
Figure 4 illustrates a ball column guide construction, in which only one end of the guide columns is fastened.

Such an arrangement is shown in Fig. 4. In the lower part of a camera casing (which is fully shown in Fig. 1) a guide column 224, which is fastened at one end only, is arranged. End portion 225 of said column is, for example, inserted in an eye 123 of camera wall 23, while its other end 226 freely projects into the interior of camera 1. Thereby, guide column 224 passes through eye 26, projecting from objective carrier 14, said eye 26 being guided on column 224 in the manner described above in connection with Fig. 1.

It will be understood from the above that this invention is not limited to the specific embodiments, designs, arrangements and other details specifically described above and illustrated in the drawings and can be carried out with various modifications without departing from the scope of the invention as defined in the appended claims.

The term "guiding ratio" is used herein to denote the ratio length: diameter of the guided member. In a guide means the possibility of occurrence of tilting is reduced if the length of the guided part relative to its diameter is increased. For example, while in the known ball guide systems in camera frames, the diameter of the guided objective tube amounts to a multiple of the effective guided length, the appended drawings show that in the present invention the diameter of the guide columns 24, 25 amounts to about ⅕ of the effective guided length of bushings 28, 29.

What is claimed is:

1. A photographic camera comprising a carrier member displaceably arranged in the camera and an objective fastened to said carrier member; at least two guide columns for guiding said carrier member; each of said columns being enclosed by a tubular ball cage for holding balls; a tubular bearing enclosing said ball cage and its balls which roll between the guide column and said tubular bearing; means for fixedly connecting said tubular bearing with the carrier member and the camera body; the axial length of said ball cages being shorter than the length of the guide columns, but longer than the axial length of said tubular bearing.

2. A photographic camera as claimed in claim 1, comprising steel bushings arranged in said tubular bearings, said balls rolling between the interior surface of said bushings and the outer surface of the guide columns.

3. A photographic camera as claimed in claim 2, in which two guide columns arranged in about diametrically opposite position are used.

4. A photographic camera as claimed in claim 3, in which the carrier member is provided with two projecting eyes arranged in about diametrically opposite position, each of said eyes enclosing one of the guide columns.

5. A photographic camera as claimed in claim 4, comprising a built-in rangefinder; means for focusing the objective, said means being coupled with said rangefinder and including an operating member; a control cam operated by said operating member; a contact roller seated on the carrier member; and a spring acting on said carrier member in order to keep said contact roller in permanent engagement with said control cam.

References Cited in the file of this patent

UNITED STATES PATENTS

| | | |
|---|---|---|
| 751,116 | Stark | Feb. 2, 1904 |
| 1,883,943 | Kindelmann et al. | Oct. 25, 1932 |
| 2,151,124 | Leitz | Mar. 21, 1939 |
| 2,380,829 | Eddy | July 31, 1945 |